Figure 1:
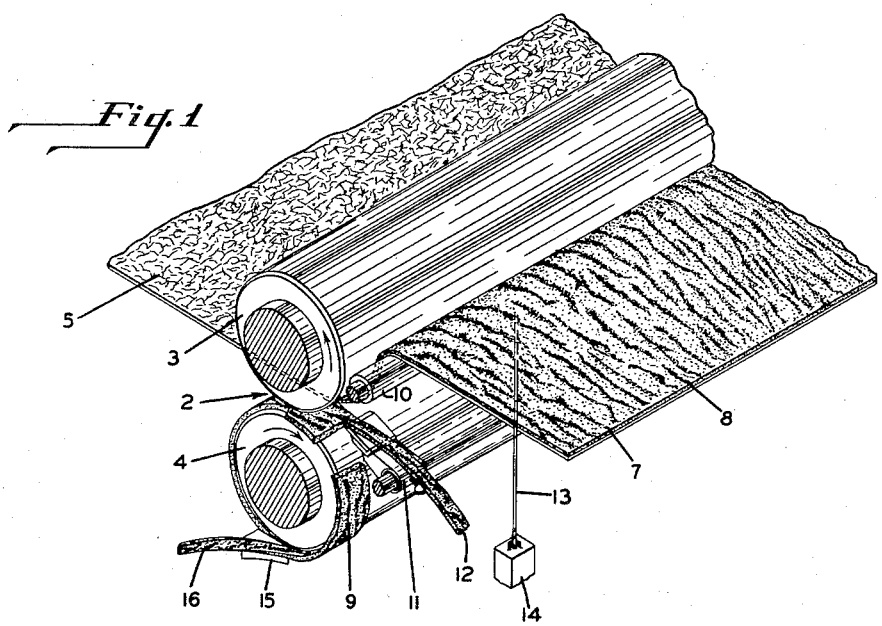

Jan. 29, 1957 E. G. SCHAIRER 2,779,387
METHOD OF MANUFACTURING HARD SURFACE COVERING WITH
PARTIAL REMOVAL OF THE SELVAGE BANDS
Filed June 22, 1953

INVENTOR
EDWARD G. SCHAIRER by
Walter J. Kaufman

ATTORNEY

2,779,387
Patented Jan. 29, 1957

2,779,387

METHOD OF MANUFACTURING HARD SURFACE COVERING WITH PARTIAL REMOVAL OF THE SELVAGE BANDS

Edward G. Schairer, Manheim Township, Lancaster County, Pa., assignor to Armstrong Cork Company, Lancaster, Pa., a corporation of Pennsylvania Application June 22, 1953, Serial No. 363,288

3 Claims. (Cl. 154—25)

This invention relates to a method and apparatus for manufacturing hard surface coverings, and more particularly to a method and apparatus for manufacturing striated hard surface coverings, including linoleum, asphalt floor covering, rubber floor covering, or the like, having a backing in the form of a continuous web, with a minimum of scrap and without substantial change in the direction of the striations.

A common practice in the linoleum industry is to produce sheet material having striations extending longitudinally of the sheet. This type of graining, commonly called "jaspe," is produced by feeding a continuous web of backing material such as burlap, felt, or the like, and depositing a mass of color composition thereon just prior to the time it passes into a two-roll calender. This mass of comminuted color composition is composed of color particles of different colors heterogeneously mixed, so that the proportioning of the color particles will be uniform across the calender. These color striations are the result of the slippage which occurs between the hot or facing roll and the bank of color composition being fed to the calender.

When this process is followed, frequently in the formation of jaspe sheets it is observed that the striations at the edges of the sheet veer or turn substantially at right angles to those running longitudinally of the sheet, such turning of the striations extending inwardly as much as twelve inches from each edge of the sheet. These angular lines along the edges of the sheet result in a finished sheet in which the striations do not all run in the same longitudinal pattern, making it extremely difficult to obtain a uniform jaspe effect when installing sheets in edge-to-edge relationship.

The chief object of this invention is to provide a method and apparatus for producing striated sheets of hard surface covering which eliminates any objectionable appearance of the edges of the sheets so formed.

Another object of my invention is to provide a method which considerably reduces the amount of scrap involved in the manufacture of hard surface coverings.

A further object is to provide a method which eliminates veering or change of direction of striations at the edges of variegated sheets and which satisfactorily trims such sheets to a desired width.

A still further object is to provide a method for making striated hard surface coverings in which selvage bands are produced at the edges of such covering.

A still further object is to provide a method adapted to form a sheet of striated hard surface covering and to trim the formed sheet to a desired width as it leaves the apparatus, and to thereafter reduce the width of the selvage bands so that the distance therebetween will be greater than the width of the sheet removed.

This invention relates to the combination with a sheeting calender adapted to form a continuous sheet of plastic composition of means for removing the central portion of the formed sheet from the calender roll and permitting selvage bands of plastic composition to remain on opposite ends of a roll.

This invention further relates to a method of making continuous sheets of plastic composition which includes the steps of calendering plastic composition to form a continuous sheet on a preformed backing, removing the central portion of the formed sheet, with the backing to which it is applied, from the calender roll while permitting side portions of the sheet to encircle the roll, removing minor portions of the roll encircling portions of the sheet, and feeding plastic composition thereto to renew the encircling portions.

Figure 2:
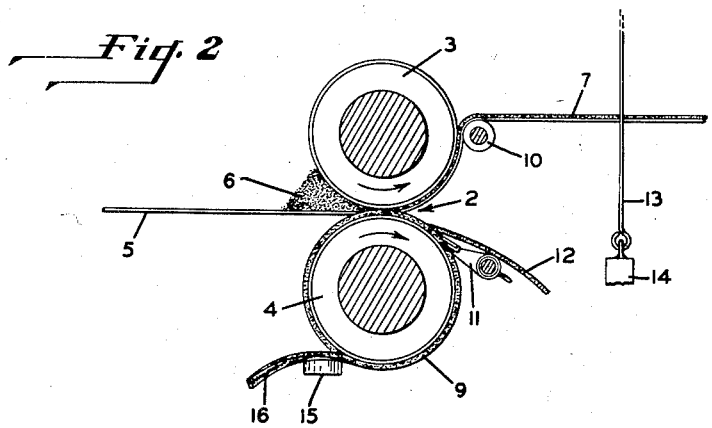

The preferred embodiment of my invention is illustrated in the attached drawing, in which:

Figure 1 is a perspective view of a sheeting calender with the device covered by this invention installed thereon; and Figure 2 is an end elevational view of the same device.

Referring to Figure 1, there is shown a conventional plastic sheeting calender 2 with the top or hot roll 3 and the bottom or cold roll 4. The web of backing material 5, such as felt, burlap, or other suitable material, is fed into the device from a suitable source of supply, not shown. The mass of varicolored granules of plastic composition 6 is loosely placed on the backing immediately before the backing passes through between the rolls. This mass of color granules 6 is supplied in sufficient quantity to form a bank across the entire width of the backing material in the nip of the calender rolls. The pressure exerted by the calender rolls consolidates the mass of varicolored granules into a sheet 7 on the backing 5, and the slippage between the top roll 3 and the bank of color composition draws the color particles out into long striations 8 in the final sheet.

In order to confine the bank of color composition to the actual width of the backing, suitable selvage plates (not shown) are provided. The selvage plates prevent the granulated color particles from spilling over the edges of the backing. However, it is impossible to extend the selvage plates into the nip of the calender roll where the actual consolidation of the sheet takes place and, consequently, if no provision is made to confine the color composition to substantially the same width as the backing to prevent the material from feathering out at the ends of the rolls, a sheet of material results in which the striations along the edges of the sheet are not parallel to the length of the sheet but flow off toward the edges of the sheet, resulting in an undesirable effect.

In order to confine the width of the sheet of color composition consolidated by the calender to substantially the width of the backing material, it has been found advantageous to permit bands of the color composition to build up on the ends of the bottom roll of the calender. These bands build up to the thickness of the spacing between the calender rolls, which is the same as the thickness of the sheet of material being calendered. In the drawing only one of these bands is illustrated by the numeral 9.

Immediately after the material leaves the consolidating area of the calender, the continuous web of backing material with the striated decorative wear layer is directed away from the calender over the idler roll 10. This can be easily accomplished without the aid of doctor blades or other devices due to the fact that the roll in contact with the plastic composition is a hot roll and the web of backing material does not adhere to the cold bottom roll.

It will be understood, of course, that the sheet of material leaving the calender will be only as wide as the backing material 5 fed into the calender, and the selvage bands 9 remaining on the bottom calender roll 4 will be spaced apart a distance equal to the exact width of the web of backing material. In actual commercial operation of this device, it has been found impossible to feed the backing material to the calender continuously over exactly the same path; the backing material shifts from side to side slightly and, consequently, if these selvage bands are permitted to remain in their original position, the edge of the backing material will ride on the selvage band at times, causing tears in the edge of the material which result in tear-offs across the entire sheet. The backing also varies in width so that some portions of the sheet will require a greater width of roll surface than other portions.

In order to prevent this from happening and to give the backing material sufficient space to shift slightly between the selvage bands, I have provided a doctoring knife 11 which cuts and removes the inner portion 12 of the selvage band. Inasmuch as the inner portion of each selvage band is removed, this increases the area of the roll between the selvage bands so that the backing material being fed to the calender can shift slightly from side to side as it is fed to the roll.

As the backing material leaves the bottom calender roll, the plastic composition on the backing is separated from the selvage bands by merely pulling away therefrom, leaving a rather rough edge on the sheet material coming away from the calender. This rough edge is easily trimmed to a smooth edge by means of a wire 13 held under tension by means of a weight 14.

It will be appreciated that the removal of the backing with the plastic composition adhering thereto permits selvage bands 9 to form at each end of the cold roll 4. Such bands 9 adhere to the cold roll 4 and are sufficiently rigid to confine the granular material to eliminate veering or change in direction of the striations at the edge of the formed sheet 7. I have found that if such bands 9 are permitted to remain as originally formed, they work outwardly toward the ends of the calender roll and hang over the end of the roll. In order to overcome this, I provide trimming blades 15 which continually cut away small ribbons 16 of composition from the selvage bands. The trimming blades 15 work on the band at the very end of the roll so that the portion 16 cut off by the knife merely falls off the end of the roll. By continually removing a small portion of the selvage bands 9, the fresh composition continually flows outwardly to renew such bands without permitting the band to extend beyond the end of the calender roll.

The practice of the method may be carried out by feeding a mass of varicolored comminuted plastic color composition to a suitable web of backing immediately before said backing passes between the rolls of a sheeting calender. The action of the sheeting calender on this mass of comminuted color composition passing through the calender consolidates the color composition on the backing, forming a continuous sheet of a width equivalent to the length of the calender rolls. The pressure of the calender rolls is sufficient to cause the composition to flow outwardly until it is stopped by the selvage plates (not shown). After passing through the calender, the backing with the consolidated color composition is directed away from the calender. This causes a severance of the consolidated color composition on a line with each edge of the backing. This removal of the backing with the color composition carried thereby forms selvage bands on the ends of the cold roll. These selvage bands adhere to the roll and in the continuous formation of the unitary sheet prevent the striations from veering or turning substantially at right angles to run longitudinally of the sheet. In order to increase the spacing between the selvage bands to be slightly greater than the width of the backing material, a narrow band is trimmed from the inner edge of each selvage band. To prevent the bands from moving outwardly over the ends of the roll, small ribbons of composition are continually severed from the bands by trimming blades positioned at the ends of the calender roll. Thus, minor amounts of fresh composition are continually being fed into and formed as a part of the bands which obviate any substantial change in shade thereof.

It will be appreciated heretofore in the manufacture of hard surface floor and wall coverings having a jaspe decoration large quantities of scrap were created by the tendency of the striations to veer or turn and flow at right angles to their original direction, which required portions of the sheet to be discarded as unsatisfactory for use. By my invention, such portions of the sheet are not formed, thus assuring a tremendous saving in material costs. The selvage bands prevent such change in direction; or if such defect occurs, it occurs in the selvage bands where it is immaterial and does not cause scrap. This invention is likewise satisfactorily employed in the manufacture of plain or monocolored hard surface covering and assists materially in the elimination of scrap since it obviates the necessity for forming large selvage portions in such coverings. In the manufacture of plain colored sheet material, the granular composition tends to flow outwardly at the edge of the sheet in a direction substantially parallel to the longitudinal axis of the calender rolls. This cross-flow of material results in a final sheet which is of a lighter gauge at the edges than in the center. By utilizing the invention set forth herein, it is possible to produce a sheet of material which is uniform in gauge across the entire sheet.

The composition forming the selvage bands is reused many times in the formation of the unitary sheet, thus preventing large amounts of composition being wasted in the production of end portions of the sheet, since the presence of such bands prevents the formation of portions of the sheet not designed for use. Such bands are continually renewed, but only minute quantities of composition are required for such renewal.

I claim:

1. In a method of making continuous sheets of plastic composition, the steps which comprise feeding a continuous web of backing material into the nip of a calender in engagement with one of the calender rolls, calendering plastic composition onto said backing to form a continuous sheet with the plastic composition extending beyond the edges of the backing, severing the plastic sheet lengthwise even with the edges of the backing, removing the sheet with the backing from the calender roll in engagement with the backing while permitting side portions of the sheet to encircle the roll forming selvage bands, and removing minor portions of the selvage bands so that the exposed portion of the roll between the selvage bands will be greater than the width of the backing.

2. In the method of making continuous sheets of plastic composition, the steps which comprise feeding a continuous web of backing material into the nip of a calender in engagement with one of the calender rolls, calendering plastic composition onto said backing to form a continuous sheet with the plastic composition extending beyond the edges of the backing, severing side portions from said sheet beyond the edges of the backing, forming the severed side portions into selvage bands encircling the ends of a calender roll in engagement with the backing, continuously removing ribbons from said selvage bands, and continuously feeding plastic compositions to renew the selvage bands.

3. In the method of making continuous sheets of plastic composition, the steps which comprise feeding a continuous web of backing material into the nip of a calender in engagement with one of the calender rolls, calendering plastic composition onto said backing to form a continuous sheet with the plastic composition extending beyond the edges of the backing, removing the central portion of the sheet with the backing from the calender roll while permitting noncontiguous portions of the formed sheet to encircle the calender roll from which the backing and central portion of the sheet have been removed, removing minor portions of said selvage bands, and continuously feeding plastic composition to renew the removed portions.

References Cited in the file of this patent

UNITED STATES PATENTS

| | | |
|---|---|---|
| 1,159,895 | Bucholtz | Aug. 10, 1915 |
| 2,225,497 | Greiser | Dec. 17, 1940 |
| 2,358,176 | MacDonald | Sept. 12, 1944 |